(No Model.)

C. B. PORTER.
FASTENER FOR BASKET COVERS.

No. 598,274.  Patented Feb. 1, 1898.

WITNESSES

INVENTOR,
Charles B. Porter.
by John Wedderburn
Attorney

UNITED STATES PATENT OFFICE.

CHARLES B. PORTER, OF NEWARK, NEW JERSEY.

FASTENER FOR BASKET-COVERS.

SPECIFICATION forming part of Letters Patent No. 598,274, dated February 1, 1898.

Application filed November 27, 1896. Serial No. 613,512. (No model.)

*To all whom it may concern:*

Be it known that I, CHARLES B. PORTER, a citizen of the United States, residing at Newark, in the county of Essex and State of New Jersey, have invented certain new and useful Improvements in Fasteners for Basket-Covers; and I do hereby declare the following to be a full, clear, and exact description of the invention, such as will enable others skilled in the art to which it appertains to make and use the same.

This invention relates to improvements in clasps or fasteners, and has more particular relation to fasteners for baskets or crates.

The invention consists of certain novel constructions, all of which will be hereinafter more particularly set forth and claimed.

Figure 1:
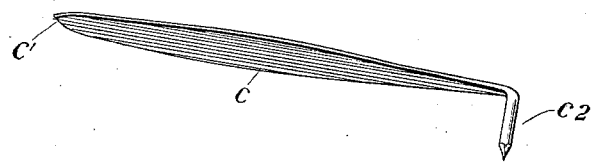
Figure 2:
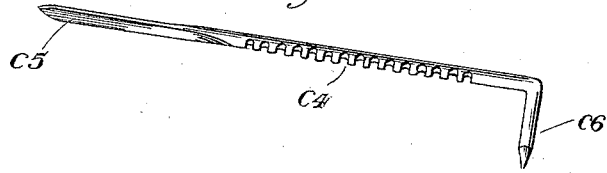
Figure 3:
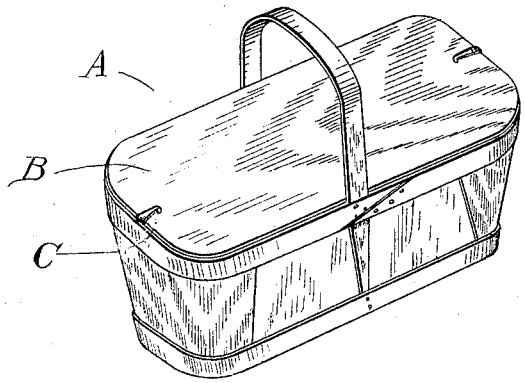

In the accompanying drawings, forming part of this specification, Figure 1 represents a perspective view of the device embodying my invention. Fig. 2 represents a perspective view of a modified form of the same, and Fig. 3 represents a perspective view of a basket with my fastener applied thereto to secure the cover in position.

A in the drawings represents a basket, B the cover, and C my improved fastener.

My said fastener is intended more particularly for use on baskets, crates, or measures having double rims over which the ordinary fastener could not be applied.

My said fastener comprises a flattened shank $c$, having a point $c'$ at one end and a hook $c^2$ at the opposite end.

In applying the fastener in position after the cover has been placed on the basket the flattened shank is first driven down between the two rims of the basket and the upper portion of the shank then bent over, so as to lie upon the cover. The hook or pointed end of said fastener is then driven into the top of the cover, thus securing said cover in position upon the top of the basket.

I preferably construct my improved fastener of copper or other similar flexible metal that will permit of its being readily bent to pass about the upper edge of the basket, but allow the hooked end to be driven into the cover. In the modified form of my invention shown in Fig. 2 the shank is formed with a plurality of corrugations $c^4$, a sharpened end $c^5$, and a hooked end $c^6$. The application of this form of my invention is practically the same as heretofore described. The corrugations upon the shank hold said shank firmly between the two rims of the basket and prevent its withdrawal upward. Said corrugations permit of additional fastening over the ordinary frictional contact between the shank and the two rims caused by driving said shank between the rims. By the employment of my invention the covers of the baskets or crates employing double rims may be instantly secured in position, so as to hold firmly against displacement by simply driving the straight shanks down between the double rims, bending the upper portion of the shank over, and driving the hooked end into the top. This cannot be accomplished by other forms of hooks that must be bent over the outside of the rims.

Having thus described my invention, what I claim as new, and desire to secure by Letters Patent, is—

1. A fastener for the covers of baskets or crates comprising a single piece of metal formed into a broad, thin pointed shank adapted to be driven down between the double rims of the basket and bent over upon the top, and a pointed hook located at one end of the shank and adapted to be driven into the material of the top of the basket, substantially as described.

2. A fastener for baskets or crates comprising a single piece of metal formed into a straight flat corrugated pointed shank adapted to be applied between the double rims of a basket and bent over upon the top of the basket, of a hook upon the upper end of said shank adapted to be driven into the material of the top of the basket, substantially as described.

In testimony whereof I have signed this specification in the presence of two subscribing witnesses.

CHARLES B. PORTER.

Witnesses:
 HARRY C. MOORE,
 WM. P. CLEVELAND.